US006857029B2

(12) United States Patent
Ganasan et al.

(10) Patent No.: US 6,857,029 B2
(45) Date of Patent: Feb. 15, 2005

(54) SCALABLE ON-CHIP BUS PERFORMANCE MONITORING SYNCHRONIZATION MECHANISM AND METHOD OF USE

(75) Inventors: Jaya Prakash Subramaniam Ganasan, Youngsville, NC (US); Adger Erik Harvin, III, Raleigh, NC (US); Richard Gerard Hofmann, Apex, NC (US); Perry Willmann Remaklus, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 10/137,084

(22) Filed: Apr. 30, 2002

(65) Prior Publication Data

US 2003/0204650 A1 Oct. 30, 2003

(51) Int. Cl.$^7$ ................................................ G06F 13/00
(52) U.S. Cl. ........................ 710/15; 710/18; 710/107; 710/110; 702/182; 702/186
(58) Field of Search ............................ 710/15, 18, 100, 710/107, 110; 702/182, 186

(56) References Cited

U.S. PATENT DOCUMENTS

| 5,590,284 | A | * | 12/1996 | Crosetto | ........................ | 712/29 |
|---|---|---|---|---|---|---|
| 5,819,053 | A | * | 10/1998 | Goodrum et al. | ........... | 710/100 |
| 5,861,882 | A | | 1/1999 | Sprenger et al. | ............. | 345/326 |
| 5,883,814 | A | | 3/1999 | Luk et al. | ..................... | 364/491 |
| 5,905,738 | A | * | 5/1999 | Whetsel | ...................... | 714/732 |
| 6,122,690 | A | * | 9/2000 | Nannetti et al. | ............. | 710/311 |
| 6,477,140 | B1 | * | 11/2002 | Uda et al. | ..................... | 370/216 |
| 6,496,890 | B1 | * | 12/2002 | Azevedo et al. | ............. | 710/110 |
| 6,587,905 | B1 | * | 7/2003 | Correale et al. | ............. | 710/107 |
| 6,629,170 | B1 | * | 9/2003 | Davidson et al. | ........... | 710/100 |

FOREIGN PATENT DOCUMENTS

EP  000476653 A2 * 3/1992 ........... G08C/25/00
JP  00148697  5/2000 ........... G06F/15/16

OTHER PUBLICATIONS

Research Disclosure Journal #34478, ISSN 0374–4353, Dec. 1992, (Database #344078).*

* cited by examiner

Primary Examiner—Rehana Perveen
(74) Attorney, Agent, or Firm—Scott W. Reid; Sawyer Law Group, LLP

(57) ABSTRACT

A bus performance monitoring mechanism for systems on a chip (SOC) is disclosed. The system comprises a muxing logic adapted to be coupled to a plurality of master devices, a plurality of slave devices, a plurality of generic signals and a plurality of control signals. The monitoring mechanism includes a plurality of control registers coupled to the muxing logic to allow for the selection of master, slave, generic and pipeline stage events to be counted. Finally, the monitoring mechanism includes synchronizing logic coupled to the plurality of registers for providing and receiving synchronizing signals to and from the monitors coupled thereto to allow for scalability. The scalable on-chip bus performance monitoring system in accordance with the present invention performs on-chip bus monitoring within a SOC implementation, while eliminating the pitfalls as described above. Through a minimalistic design approach, scalability is easily accomplished through the concept of using multiple monitor instances of these monitoring mechanisms within an SOC design while maintaining synchronization among them. Should an SOC design increase in size, scalability is achieved by simply adding additional monitor instance(s). The multiple monitor instances could then be connected in a "lego-like" fashion, allowing each to operate independently, or concurrently with one another via a scalable synchronization technique. For these designs where multiple monitor instances may be required, this enhances wireability by allowing the SOC designer to scatter the monitor instance locations virtually anywhere within the smaller areas of unused chip space, and simply wire the synchronization signals among the monitor instances to allow for synchronous operation.

27 Claims, 7 Drawing Sheets

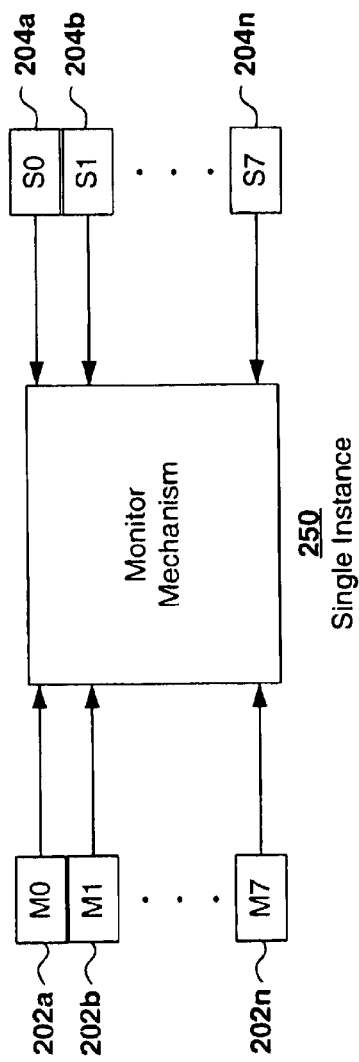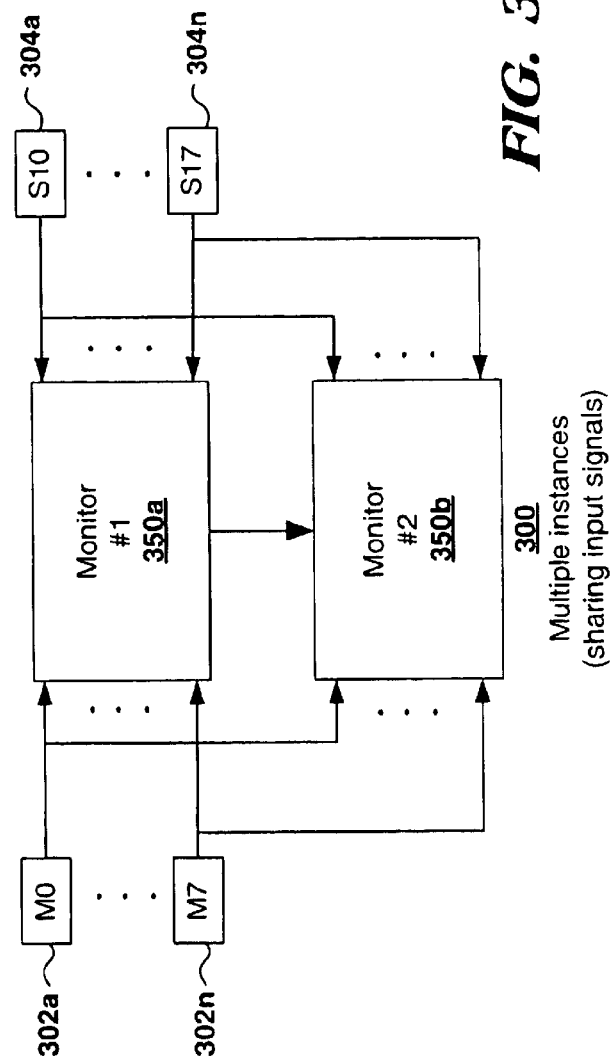

Concurrent and Staggered Functionality

SCALABLE ON-CHIP BUS PERFORMANCE MONITORING SYNCHRONIZATION MECHANISM AND METHOD OF USE

FIELD OF THE INVENTION

The present invention relates generally to system on chip (SOC) designs and specifically to monitoring bus performance on such designs.

BACKGROUND OF THE INVENTION

Circuit designs are typically system level designs on a system on chip (SOC). In system level designs board-level bus analysis is usually accomplished through the use of connectors and cables which attach to the system bus, allowing devices (such as logic analyzers, digital oscilloscopes, etc.) to sample bus transactions over a given time period. As system-level board designs have migrated to system on chip (SOC) designs, there should exist a similar mechanism to perform at speed on-chip bus performance analysis.

There are two conventional approaches to accomplishing a similar task:

1. Internal logic for on-chip analysis has been implemented in some processor designs, however, those implementations are limited to tracking logic activity within the processor core. Those versions lack the capability of monitoring any bus activity external to the processor, therefore, facilitating an alternate means of monitoring if a processor's transactions transition correctly outside of the processor core. In processor-embedded SOCs where much activity is performed external (and sometimes independent) of the processor, there needs to exist a method of verifying this.
2. In other on-chip implementations, internal bus signals are wired to off-chip pins. An external analysis device is then attached and samples the data from the off-chip pins.

However, for this mechanism to attach to all of the necessary internal signals and allow full flexibility in the types of bus monitoring that can be performed, the design could become quite large. As SOC designs are starting to utilize more die area, fitting such an oversized design block into the SOC layout becomes quite a challenge for placement and wiring, especially where contiguous whitespace is virtually nonexistent. Another problem would be that a design of such a large fixed-size mechanism does not lend itself well to implementations in larger SOC designs where bus traffic from a few additional devices may require monitoring. This limits the mechanism's scalability, possibly requiring a redesign of the performance-monitoring mechanism specifically for designs where functionality may have increased.

Accordingly, what is needed is a system and method for monitoring bus activity in an SOC that is scalable and does not add significantly to the die size or cost with the SOC. The present invention addresses such a need.

SUMMARY OF THE INVENTION

A bus performance monitoring mechanism system on chip (SOC) is disclosed. The system comprises a muxing logic adapted to be coupled to a plurality of master devices, a plurality of slave devices, a plurality of generic signals and a plurality of control signals. The monitoring mechanism includes a plurality of control registers coupled to the muxing logic to allow for the selection of master, slave, generic and pipeline stage events to be counted. Finally, the monitoring mechanism includes synchronizing logic coupled to the plurality of registers for providing and receiving synchronizing signals to and from the monitors coupled thereto to allow for scalability.

The scalable on-chip bus performance monitoring system in accordance with the present invention performs on-chip bus monitoring within a SOC implementation, while eliminating the pitfalls as described above. Through a minimalistic design approach, scalability is easily accomplished through the concept of using multiple monitor instances of these monitoring mechanisms within an SOC design while maintaining synchronization among them. Should an SOC design increase in size, scalability is achieved by simply adding additional monitor instance(s). The multiple monitor instances could then be connected in a "lego-like" fashion, allowing each to operate independently, or concurrently with one another via a scalable synchronization technique. For these designs where multiple monitor instances may be required, this enhances wireability by allowing the SOC designer to scatter the monitor instance locations virtually anywhere within the smaller areas of unused chip space, and simply wire the synchronization signals among the monitor instances to allow for synchronous operation.

BRIEF DESCRIPTION OF THE DRAWINGS

FIG. 2 illustrates connectivity within a design containing eight or less processor local bus (PLB) master and eight or less PLB slave devices, where a single monitor instance would be sufficient.

FIG. 3 and FIG. 4 illustrate connectivity within an SOC design where two monitor instances may be desired.

DETAILED DESCRIPTION

Figure 1:
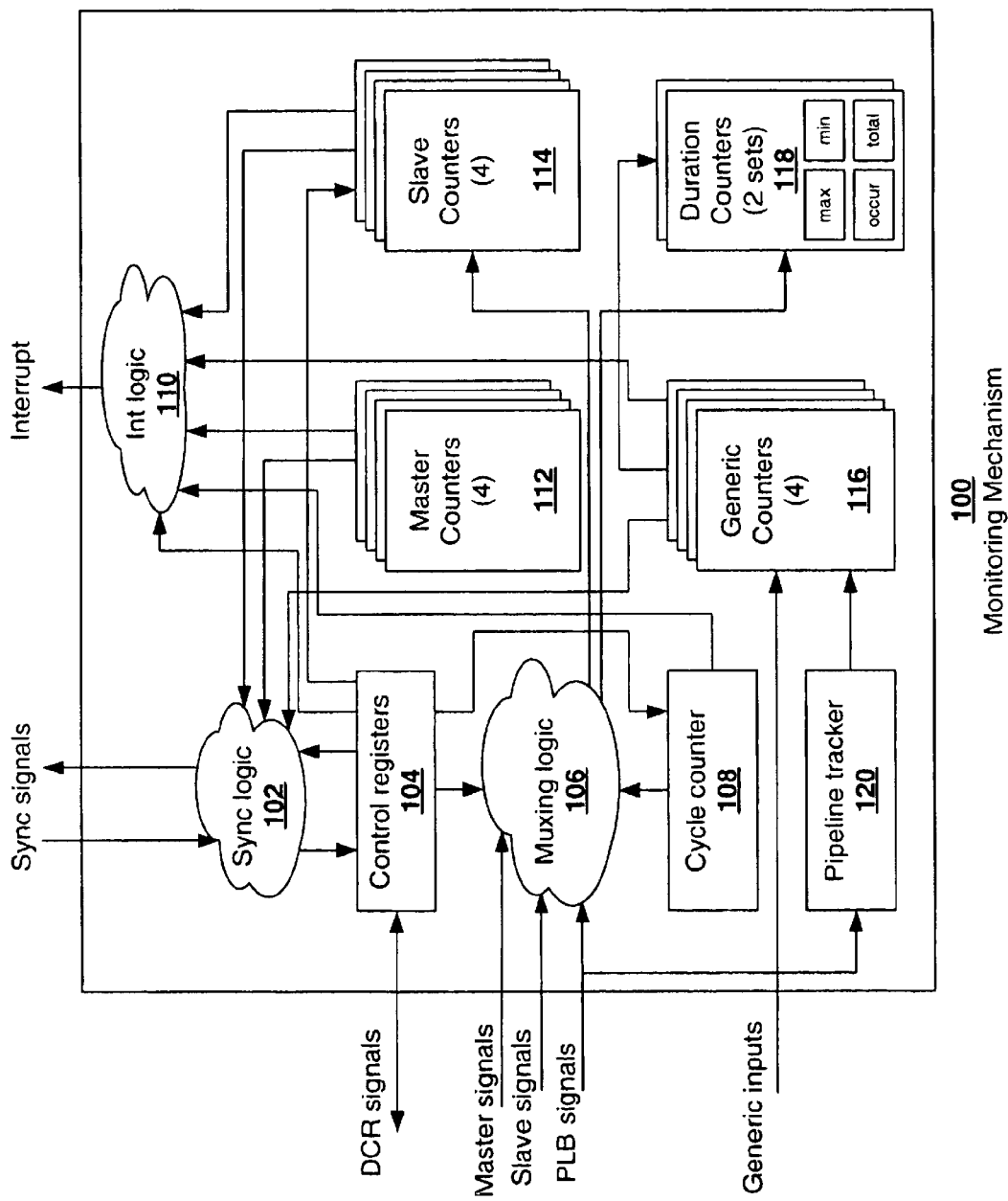
FIG. 1 is a block diagram of a scalable on-chip bus performance monitoring mechanism.

The present invention relates generally to system on chip (SOC) designs and specifically to monitoring bus performance on such designs. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

An on-chip bus performance mechanism in accordance with the present invention is scalable for accommodating larger SOC designs. A bus performance monitoring mechanism in accordance with the present invention tracks the occurrence and/or duration of events associated with on-chip bus transactions. Events are tracked on a per master and/or per slave basis, and can be selectably isolated in accordance with user definable qualifications. The measurements which can be performed include: bus signal occurrence measurements, data-bus tenure, and address pipeline measurements. These measurements provide a means for systems designers to assess the performance of the SOC and also provide a mechanism for performing both hardware and software debugging for chip-level problem analysis.

A bus performance monitoring mechanism in accordance with the present invention has the following features.

Input ports to simultaneously connect up to a plurality (i.e., eight) of PLB masters, a plurality (i.e., eight) of PLB slaves, and a plurality (i.e., four) of generic signals.

Registers to allow selection of master, slave, generic and pipeline-stage events to be counted.

Selectors to simultaneously track events from a plurality of PLB masters, a plurality of PLB slaves and either four pipeline-stage events or four external generic events.

Configuration bits for selecting priority matching, address matching, transfer-size matching, and/or read/write matching, allowing finer granularity when tracking certain PLB master events.

Configuration bits for selecting a master identification matching, read/write matching, and primary/secondary transaction matching allow finer granularity when tracking certain PLB slave events.

Separate counters for tracking the minimum duration value, maximum duration value, total duration value, and the event occurrence totals of PLB-slave-related-transactions. Two sets of duration counters allowing concurrent tracking of a plurality of duration-events associated with any of the plurality of slaves.

Pipeline-depth-tracking for independent monitoring of hits-per-pipeline depth level for both read and write data buses. This supports PLB implementations having a read-pipeline depth no greater than four, and a write-pipeline depth no greater than two.

Variable power consumption modes allowing the core to be placed into different levels of inactivity.

Bus Monitor Mechanism

FIG. 1 illustrates a block diagram of a bus performance monitoring mechanism 100 in accordance with the present invention. In a preferred embodiment, the processor bus architectures utilized are a CoreConnect Processor Local (PLB) Bus architecture and Device Control Register (DCR) Bus architecture by IBM Corporation. One of ordinary skill in the art readily recognizes that any processor bus architecture could be utilized and they would be within the spirit and scope of the present invention. PLB master signals, PLB slave signals and other PLB signals are provided to a muxing logic 106. The muxing logic 106 also receives signals from a cycle counter 108 and control registers 104 respectively. The control registers 104 have a device control register (DCR) bus interface for reading and writing to the control registers 104. The control registers 104 also provide and receive signals from sync logic 102. The sync logic 102 provides and receives sync signals from the other monitor instances of the monitoring mechanism as needed. The sync logic 102 also receives signals from a plurality of generic counters 116, a plurality of master counters 112 and a plurality of slave counters 114. The plurality of master counters 112, plurality of slave counters 114, and plurality of generic counters 116 also provide signals to interrupt logic 110.

Interrupt logic 110 also receives signals from cycle counter 108. The PLB signals are provided to a pipeline tracker 120 which in turn provides signals to a plurality of generic counters 116. Generic inputs are also provided to the plurality of generic counters 116. The plurality of generic counters 116 also provide input to the sync logic 102 as well as to the interrupt logic 110. The plurality of duration counters 118 also receive a signal from the muxing logic 106.

The bus performance monitoring mechanism 100 performs in the following functions. Muxing logic 106 simultaneously connects up to a plurality (i.e., eight) of PLB masters, a plurality (i.e., eight) of PLB slaves, and a plurality (i.e., four) of generic signals. Control registers 104 allow for the selection of master, slave, generic and pipeline-stage events to be counted.

The pipeline tracker 120 simultaneously tracks events from up to four PLB masters, up to four PLB slaves and either four pipeline-stage events or four external generic events. Configuration bits are within the control registers 104 for selecting priority matching, address matching, transfer-size matching, and/or read/write matching, allowing finer granularity when tracking certain PLB master events. Configuration bits are also within the control registers 104 for selecting Master ID matching also allow finer granularity when tracking certain PLB slave events. There are also separate duration counters 118 for tracking the minimum duration value, maximum duration value, total duration value, and the event occurrence totals of PLB-slave-related-transactions. The two sets of duration counters 118 allow concurrent tracking of up to two duration-events associated with any of the plurality of slaves.

The pipeline-depth tracker 120 provides for independent monitoring of hits-per-pipeline depth level of both read and write data buses. The pipeline tracker supports PLB implementations having a read-pipeline depth no greater than four, and a write-pipeline depth no greater than two. Finally, variable power consumption modes are handled by the mux logic 106 to allow the mechanism to be placed into different levels of inactivity.

Scalability Description

Figure 4:
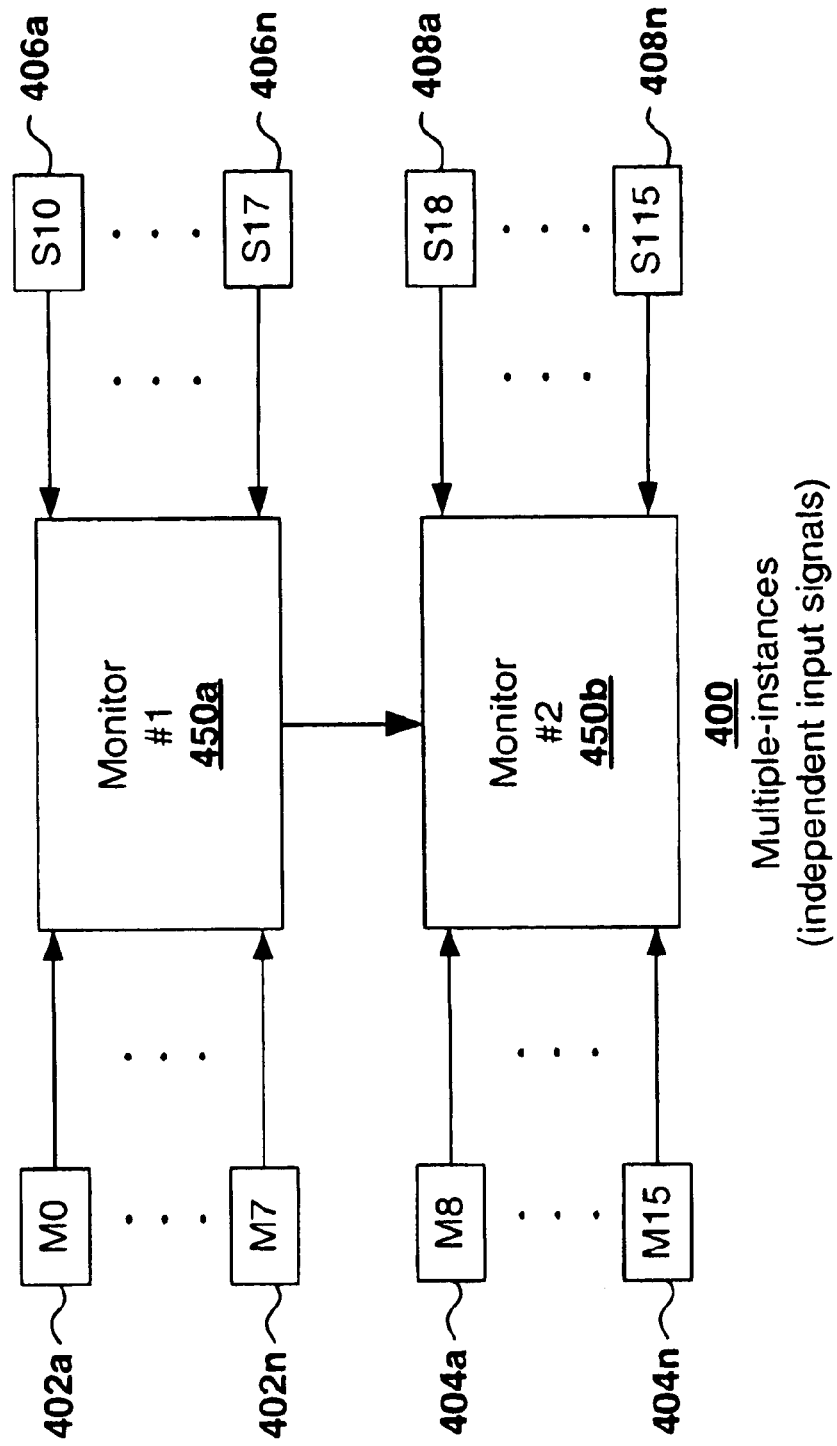

The architecture of a full embodiment of this design is small enough to allow multiple monitor instances to coexist in a single system-on-chip (SOC) layout. Each embodiment allows for simultaneous monitoring of events from up to 8 PLB masters, 8 PLB slaves, and 4 extra non-PLB signals. Each could be wired to monitor the signals (and events) from the same PLB masters and slaves, or wired to receive signals (events) from a different set of PLB masters and slaves. This allows greater flexibility for SOC designs to monitor larger sets of events across larger designs. Examples are illustrated in the following diagrams, where, for example, Mn and S1n represent CoreConnect PLB Master and PLB slave devices, respectively. FIG. 2 illustrates connectivity within a design containing eight or less PLB master and eight or less PLB slave devices, where a single monitor 250 instance of the bus performance monitor would be sufficient. FIG. 3 and FIG. 4 illustrate connectivity within an SOC design where two monitor instances of the bus performance monitors 350a, 350b, 450a and 450b, respectively, are desired.

Figure 5:
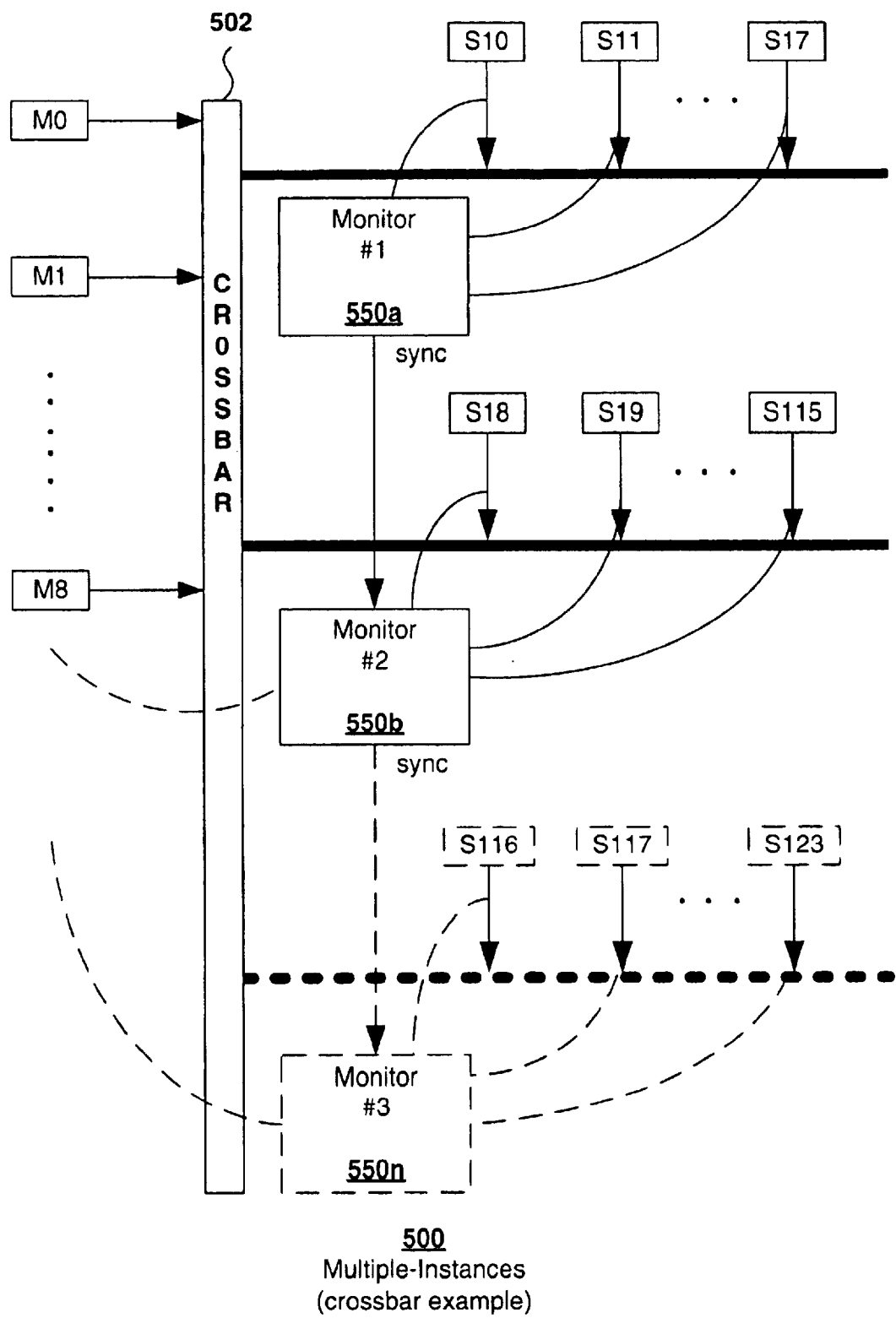
FIG. 5 illustrates a crossbar design in accordance with the present invention.

The small scalable design structure also allows ease in placement and wiring within SOCs where contiguous spatial area is limited. Each monitor instance could be placed where a minimal space is available, possibly across chip from other monitor instances. An SOC design utilizing a "crossbar" type of PLB bus configuration is a good example where the scalability feature can be shown. FIG. 5 illustrates a crossbar design 500 in accordance with the present invention. Typically in crossbar designs, there would exist a master-side bus 502, and multiple slave-side buses 504a–504n (called ways), where each slave way 504a–504n can contain a given set of slave devices. In these designs, one could instantiate a separate monitoring mechanism 550a–550n for each slave bus. As the number of slave ways increase, one could simply implement additional monitors. This configuration also lends itself well to the ability of individually monitoring the pipeline usage of each slave data bus.

Synchronization and Triggering Description

Figure 6:
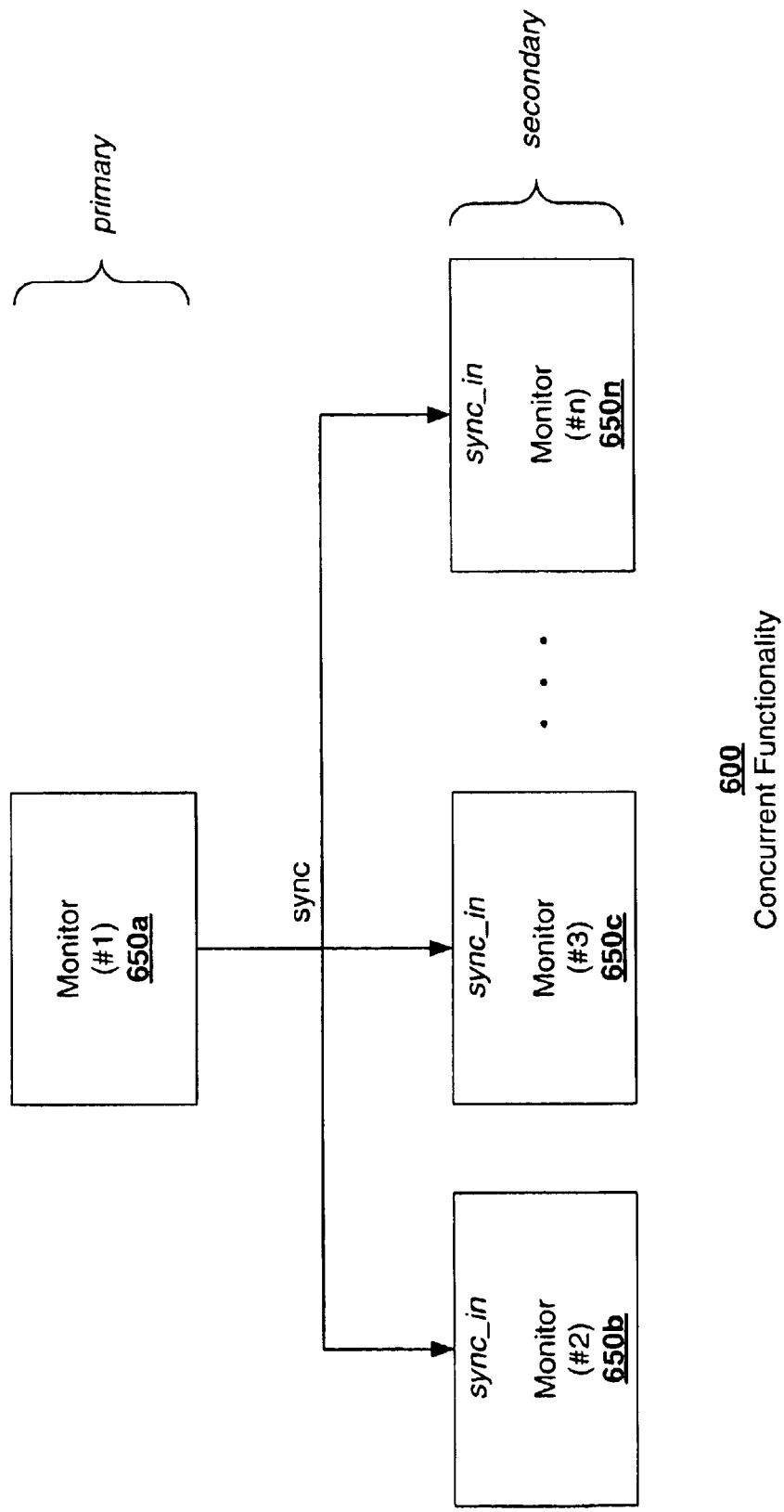
FIG. 6 illustrates a wiring within an SOC configuration allowing all monitor instances to operate concurrently.

In SOC designs requiring multiple monitor instances of the scalable on-chip performance monitoring synchronization mechanism to be implemented, there could exist a means of either allowing each monitor instance to function either independently or synchronously with one another. With each monitor instance having a sync-in and a sync-out signal port, the monitor instances can be easily connected allowing sychronization. Examples of chip-level sync wiring among monitor instances are described below. FIG. 6 illustrates a wiring 600 within an SOC configuration allowing all monitoring instances 650a–650n to operate concurrently. One monitor instance would act as the primary core (650a), and all remaining (secondary) monitor instances 650b–650n could be wired to receive the sync_out signals from this primary core. Wired in this configuration, software programmers could configure (via register bits in each monitor instance's control register) the secondary monitor instances to perform in the "synchronous" mode, requiring desired measurements. This feature allows all monitor instances to begin programming measurements at the same time. In this configuration all secondary monitor instances are to be programmed first, yet each will not begin functioning until the primary monitor instance has programmed and started. Therefore, all monitor instances will operate concurrently.

Figure 7:
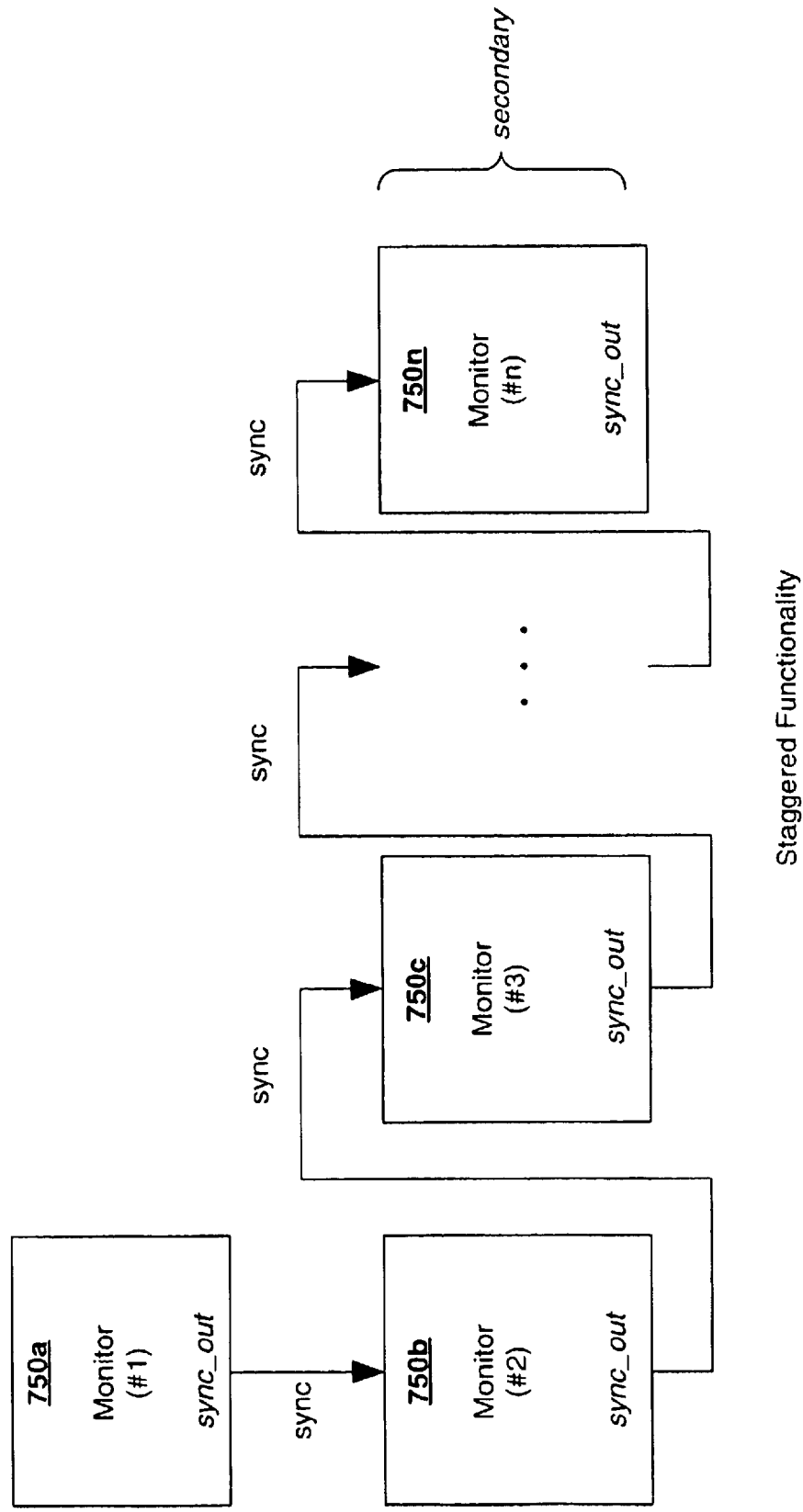
FIG. 7 illustrates a wiring example within an SOC allowing a multistage "staggered-sample-triggering" relationship among the multiple monitor instances to exist.

Within the monitoring architecture as described in this disclosure there exists a feature for "staggered-sample-triggering". This feature allows a primary monitor instance to activate its sync_out signals, after it has completed its currently selected measurement(s). Should multiple monitor instances be required within an SOC layout, this feature allows subsequent (secondary) monitor instances to be programmed to start functioning only after its primary monitor instance has completed performing its measurement (as defined in its controlling registers). This feature is similar to that of a logic analyzer apparatus in that special triggering schemes can be performed to measure the "hard-to-find" bus-related transactions. FIG. 7 illustrates a wiring example 700 within an SOC allowing a multistage "staggered-sample-triggering" relationship among the multiple monitor instances to exist. In this layout, each instance is triggered only when the previous instance has completed its sampling. If all instances are wired to monitor the same PLB-related signals/events (see FIG. 3) a greater granularity in sampling those hard-to-find events could be achieved.

Figure 8:
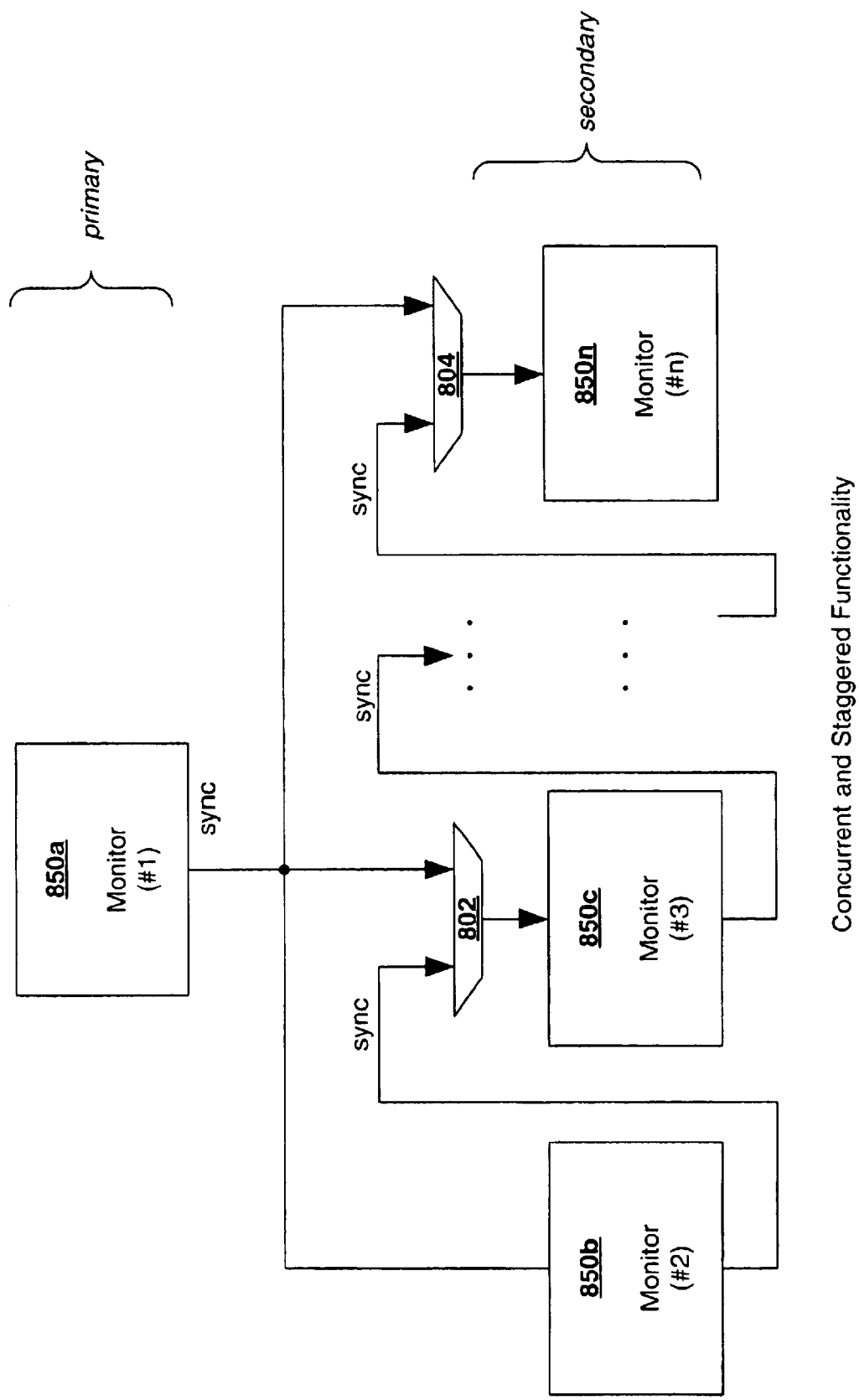
FIG. 8 illustrates a chip-level wiring example allowing the monitor instances the capability to perform in both of the above functional modes.

FIG. 8 illustrates a chip-level wiring example 800 for a plurality of monitor instances 850a–850n. The muxes 802 and 804 allow the monitor instances 850a–850n to perform in concurrent, staggered, or mixed functionality based upon the selection of the muxes 802 and 804.

The scalable on-chip bus performance monitoring system in accordance with the present invention performs on-chip bus monitoring within a SOC implementation, while eliminating the pitfalls as described above. Through a minimalistic design approach, scalability is easily accomplished through the concept of using multiple monitor instances of these monitoring mechanisms within an SOC design while maintaining synchronization among them. Should an SOC design increase in size, scalability is achieved by simply adding additional monitor instance(s). The multiple monitor instances could then be connected in a "lego-like" fashion, allowing each to operate independently, or concurrently with one another via a scalable synchronization technique.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A bus performance monitor for systems on a chip (SOC) comprising:
   a muxing logic adapted to be coupled to a plurality of master devices, a plurality of slave devices, a plurality of generic signals and a plurality of control signals;
   a plurality of control registers coupled to the muxing logic to allow for the selection of master, slave, generic and pipeline stage events to be counted; and
   synchronizing logic coupled to the plurality of registers for providing and receiving synchronizing signals to and from other bus performance monitors coupled thereto to allow for scalability.

2. The bus performance monitor of claim 1 wherein the control registers include configuration bits for selecting matching when tracking a plurality of master events.

3. The bus performance monitor of claim 2 wherein the matching comprises any of the following of priority matching, address matching, transfer size matching and read/write matching.

4. The bus performance monitor of claim 1 wherein the control registers include configuration bits for allowing finer granularity when tracking a plurality of slave counts based upon a master ID, read/write and primary/secondary transaction matching.

5. The bus performance monitor of claim 1 which includes a plurality of duration counters for tracking the minimum duration value, maximum duration value, total duration value, and the event occurrence totals of the slave related transactions.

6. The bus performance monitor of claim 5 wherein the duration counters allow for concurrent tracking of a plurality of duration events associated with the plurality of slave devices.

7. The bus performance monitor of claim 1 which includes a pipeline tracker for monitoring specific levels of address pipelining on the bus.

8. The bus performance monitor of claim 6 which includes a pipeline tracker for monitoring specific levels of address pipelining on the bus.

9. The bus performance monitor of claim 7 which includes a cycle counter coupled to the synchronization logic and the muxing logic that increments every time an event occurs.

10. The bus performance monitor of claim 9 which includes a plurality of master counters and a plurality of slave counters for receiving signals from the muxing logic, the plurality of slave counters for counting slave device events and the plurality of master counters for counting master device events.

11. The bus performance monitor of claim 10 which includes interrupt logic coupled for receiving the value of the master event counters, slave event counters, generic event counters and cycle counter; and providing an interrupt based upon any of these counters being at a predetermined level.

12. A system on chip (SOC) design comprising:
   at least one bus;
   at least one slave device coupled to the at least one bus;
   at least one master device coupled to the at least one bus; and
   at least one monitor coupled to the at least one bus for monitoring activity of the at least one slave device and the at least one master device, the monitor being scalable such that other monitors can be coupled thereto, wherein the at least one monitor includes logic which provides and receives signals for synchronizing the monitor with other monitors.

13. The SOC of claim 12 wherein a plurality of monitors have either independent input signals or shared input signals.

14. The SOC of claim 13 wherein the plurality of monitors operate concurrently.

15. The SOC of claim 13 wherein the plurality of monitors operate in a staggered functionality.

16. The SOC of claim 13 wherein the plurality of monitors operate in a combination of concurrent and staggered functionality.

17. The SOC of claim 12 wherein the at least one monitor comprises:
   a muxing logic adapted to be coupled to a plurality of master devices, a plurality of slave devices, a plurality of generic signals and a plurality of control signals;
   a plurality of control registers coupled to the muxing logic to allow for the selection of master, slave, generic and pipeline stage events to be counted; and
   synchronizing logic coupled to the plurality of registers for providing and receiving synchronizing signals to and from other monitors coupled thereto to allow for scalability.

18. The SOC of claim 17 wherein the plurality of control registers include configuration bits for selecting matching when tracking a plurality of master events.

19. The SOC of claim 18 wherein the matching comprises any of the following of priority matching, address matching, transfer size matching and read/write matching.

20. The SOC of claim 17 wherein the control registers include configuration bits for allowing finer granularity when tracking a plurality of slave counts based upon a master ID, read/write and primary/secondary transaction matching.

21. The SOC of claim 17 which includes a plurality of duration counters for tracking the minimum duration value, maximum duration value, total duration value, and the event occurrence totals of the slave related transactions.

22. The SOC of claim 21 wherein the duration counters allow for concurrent tracking of a plurality of duration events associated with the plurality of slave devices.

23. The SOC of claim 22 which includes a pipeline tracker for monitoring specific levels of address pipelining on the bus.

24. The SOC of claim 23 wherein the specific levels indicate usage of a particular pipeline depth for both read and write data busses.

25. The SOC of claim 23 which includes a cycle counter coupled to the synchronization logic and the muxing logic that increments every time an event occurs.

26. The SOC of claim 25 which includes a plurality of master counters and a plurality of slave counters for receiving signals from the muxing logic, the plurality of slave counters for counting slave device events and the plurality of master counters for counting master device events.

27. The SOC of claim 25 which includes interrupt logic coupled for receiving the value of the master event counters, slave event counters, generic event counters and cycle counter; and providing an interrupt based upon any of these counters being at a predetermined level.

\* \* \* \* \*